United States Patent [19]

Daly et al.

[11] 4,174,975

[45] Nov. 20, 1979

[54] METHOD FOR THE MANUFACTURE OF WATER SOLUBLE ADHESIVES

[75] Inventors: Thomas W. Daly, Imperial; Ralph A. Hoer, Ballwin; James E. Walsh; Henry T. James, both of St. Louis, all of Mo.

[73] Assignee: Ralston Purina Company, St. Louis, Mo.

[21] Appl. No.: 829,686

[22] Filed: Sep. 1, 1977

[51] Int. Cl.² ............................................. C08L 89/00
[52] U.S. Cl. .................................................. 106/161
[58] Field of Search ................................ 106/198, 161

[56] References Cited

U.S. PATENT DOCUMENTS 2,701,210   2/1955   Fisher et al. .................... 106/181

*Primary Examiner*—Theodore Morris
*Attorney, Agent, or Firm*—Virgil B. Hill

[57] ABSTRACT

An improved method for continuously and automatically manufacturing water soluble adhesives for use in coatings is disclosed. A continuous flow of water is heated, an antifoam agent is injected into the flow of water, the solids base for the adhesive is admixed into the flow at a predetermined level and an alkali cutting agent is added directly into the flow.

4 Claims, 1 Drawing Figure

METHOD FOR THE MANUFACTURE OF WATER SOLUBLE ADHESIVES

BACKGROUND OF THE INVENTION

This invention relates generally to a method for continuously slurrying adhesive solids in an aqueous medium, cooking and cutting the slurry with an alkali cutting agent so as to disperse the solids and thereby create a homogeneous water soluble adhesive for use as a coating binder.

In the past it has always been advantageous to purchase coating ingredients in dry form because of considerable savings on freight and energy. Previously, however the manufacturer of the coating adhesive would prepare the formulation onsight in a batch wise system. The dry powder was added to water with agitation and heated in a steam jacketed vessel or by sparging steam directly into the slurry. There was a wetting-in period of approximately 5 minutes. At the end of the wet-in period, a suitable alkali was added to the slurry and the temperature of the mixture was adjusted to between 140° and 160° F. while the slurry was mixed for approximately 30 minutes. There were several drawbacks to that method. Clearly, it was cumbersome and time consuming, but more importantly the method permitted manufacture of an adhesive which was limited to no more than 14 to 18% solids. A large reaction vessel was essential, and an unduly long heating period was necessary, accurate and reproduceable mixtures were infrequent and an excessive energy demand was placed upon the batch system in which the reaction took place.

In accordance with this invention, it is possible to eliminate the manual batch wise operations, to reduce the necessary energy, and to significantly increase the rate of output. It is also possible to accurately reproduce the mixtures on a continuous basis.

SUMMARY OF THE INVENTION

Therefore, the general object of the present invention is to provide a simplified and continuous means for manufacturing the water soluble adhesives at substantial economic and energy savings.

Another object of the present invention is to provide a means for manufacturing a proteinaceous adhesive under substantially less labor intensive conditions, completely automated.

A most important aspect of the present invention is an increase in flexibility which would permit an efficient manufacture of a protein adhesive containing over 20% solids if desired.

DETAILED DESCRIPTION OF THE PREFERRED EMBODIMENT

Figure 1:
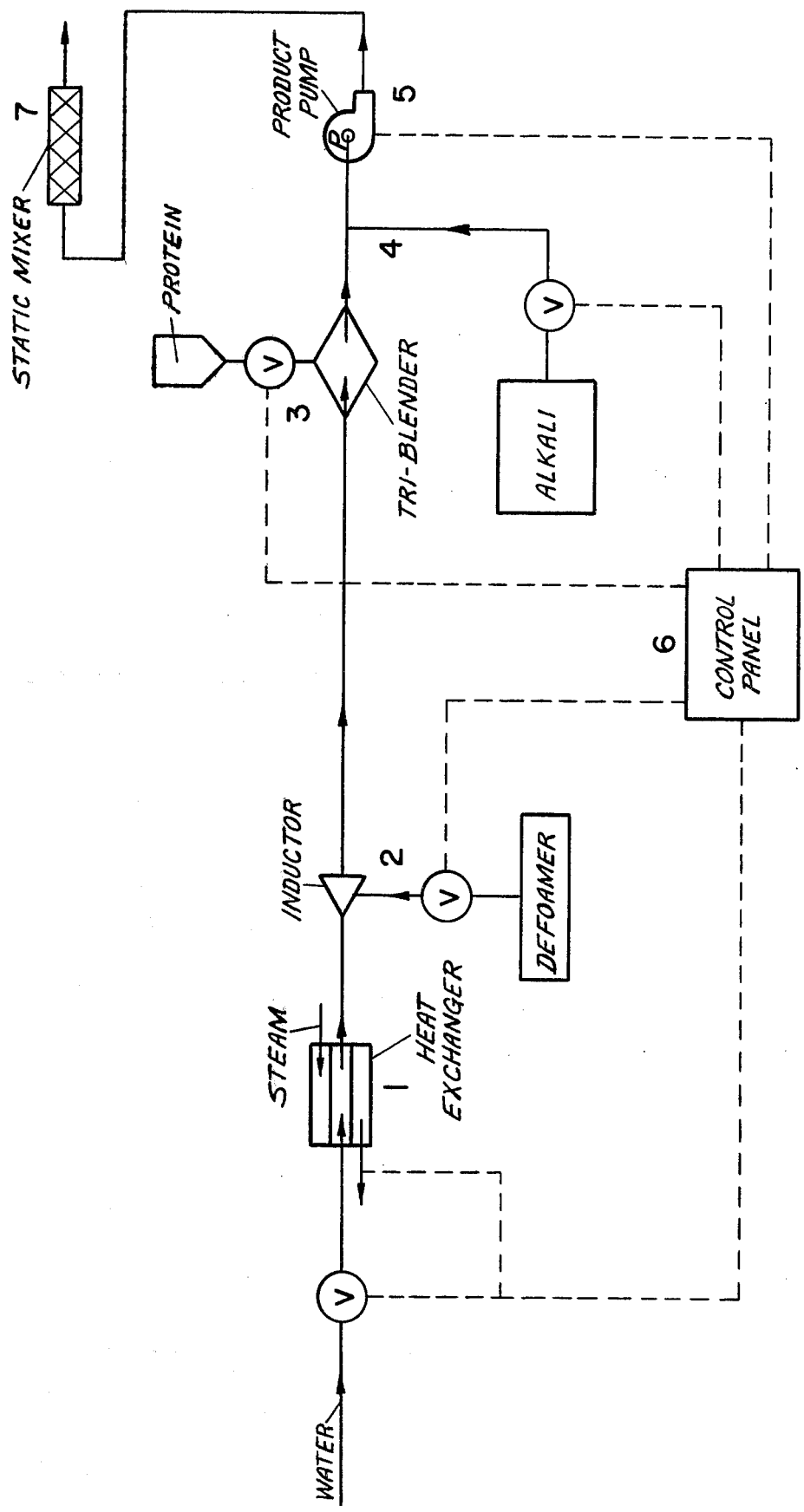
FIG. 1 is a flow diagram of the process of this invention.

Referring now to FIG. 1, in accordance with the present invention, water is continuously heated (1) at a rate sufficient to provide a temperature between 32° F. and 212° F., preferably 160° F. The temperature must be sufficiently high to cook the adhesive solids, preferably protein. By "cooking" the solids one means eliminating small gel particles. Nevertheless, excessive heating must be avoided to prevent vaporization of the water, vapor lock in the product pump and interruptions in the flow pattern.

The water is then subjected to a venturi (2) flow pattern as for example, through an inducer where an anti-foam agent is added at a rate of from about 0.01% to 5% by weight, based upon the dry weight of the adhesive solids. The anti-foam may be, for example, any of the commercial liquid material. Other additives which serve to modify various characteristics of the adhesive may be added in this same fashion. The anti-foam and/or other additives may or may not be necessary depending upon desired end use. Although the venturi flow addition is preferred direct injection into the system without a venturi is acceptable.

The flow is subjected to vortex flow mixing (3) as for example through a Tri-Blender ® at which point the adhesive solids are added. The adhesive solids are preferably protein, such as for example, hydrolyzed soy protein isolate and casein. Also, starch may be utilized. The solids should be ground into free-flowing form and of fairly consistent bulk density for most effective results. It is of note that if starch is utilized, an additional heating means will be employed downstream from the point at which the starch is added. This is because the starch must be cooked at a temperature of at least 190° F. but if the system is that hot prior to starch addition, there is a danger of vapor lock in the vortex flow mixing stage of the system.

By vortex flow mixing it is meant that the protein and water are admixed with agitation and they come together in a vortex creating a more homogeneous mixture.

An alkali solution such as $NH_4OH$ is directly injected at (4) at a rate of from about 0.025 to 0.044 lbs/lb $H_2O$. The precise rate will vary depending upon the particular alkali, its buffering capacity and the particular characteristics desired. Provided that a pH of from about 8.5 to 14.0 is obtained a suitable cutting action will occur. By cutting action it is meant that the insoluble protein will become soluble. Typical examples of alkali are $NH_4OH$ and $NaOH$. It is particularly preferred to use $NH_4OH$ because there is little residual salt left in the coating. The alkali ($NH_4OH$) will ordinarily be used at a concentration of 26° Be.

The product (5) delivers the desired flow rate which is from about 24 to 26 gallons/minute. There is a static mixer (7) employed downstream from the pump in order to completely intersperse the alkali throughout the slurry thus assuring a homogeneous reaction.

The various ingredient streams of this process may be fitted with a series of interlocking valves that are automatically operated in sequence and at predetermined invervals at (6). This permits automatic and continuous manufacture of the proteinaceous adhesive.

The following Example will illustrate the operation of this invention.

EXAMPLE I

Water is pumped through a heat exchanger at 19.3 gallons/minute. Then 125 psi steam is used to heat the water to 160° F. which takes 100 BTU/# of the water. Antifoam is metered into the water stream at a rate of 120 ml/min. Soy protein adhesive solids are metered into Tri-Blender at a rate of 40#/min. on a 90% dry basis as the heated water stream containing antifoam passes through the Tri-Blender at a rate of 0.8 gal/min. The product has a solids level of about 20%. It utilizes only $2.125 \times 10^5$ BTU to heat the water per 500 lbs of protein as opposed to a batch process which have required $2.85 \times 10^5$ BTUs.

What is claimed is:

1. An improved method for manufacturing water soluble adhesives, comprising the steps of:
   a. heating a continuous flow of water at a rate of from about 90 to 110 BTU/#;
   b. subjecting said flow to a venturi flow pattern;
   c. injecting through the venturi into the heated flowing water an antifoaming agent at a rate of from 0.01% to 5% of the rate of adhesive solids addition;
   d. then subjecting the flowing water to vortex flow mixing conditions.
   e. admixing adhesive solids at the point of the vortex flow mixing at a rate of from about 0.25 to 0.33 lbs adhesive solids/# $H_2O$;
   f. then injecting from about 0.026 to 0.044 lbs of an aqueous alkali solution/# $H_2O$, said alkali solution serving to adjust the pH of the solution to greater than 8.5;
   g. and finally subjecting the flow to a static mixing action.

2. The method of claim 1 wherein the adhesive solids are proteinaceous solids.

3. The method of claim 1 wherein the alkali is $NH_4OH$.

4. The method of claim 1 wherein the alkali is NaOH.

* * * * *